(12) United States Patent
Wang et al.

(10) Patent No.: US 11,295,042 B2
(45) Date of Patent: Apr. 5, 2022

(54) DATA PROCESSING METHOD FOR BLUEPRINT DESIGN, PLM WIDGET AND COMPUTATION DEVICE

(71) Applicant: BOE TECHNOLOGY GROUP CO., LTD., Beijing (CN)

(72) Inventors: Jieli Wang, Beijing (CN); Jiangbo Luo, Beijing (CN); Xu Zhang, Beijing (CN); Ce Jing, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 334 days.

(21) Appl. No.: 16/471,482

(22) PCT Filed: Jan. 7, 2019

(86) PCT No.: PCT/CN2019/070649
§ 371 (c)(1),
(2) Date: Jun. 19, 2019

(87) PCT Pub. No.: WO2019/242298
PCT Pub. Date: Dec. 26, 2019

(65) Prior Publication Data
US 2020/0387642 A1 Dec. 10, 2020

(30) Foreign Application Priority Data
Jun. 19, 2018 (CN) .......................... 201810628272.4

(51) Int. Cl.
*G06F 30/12* (2020.01)
*G06F 111/20* (2020.01)
(52) U.S. Cl.
CPC .......... *G06F 30/12* (2020.01); *G06F 2111/20* (2020.01)

(58) Field of Classification Search
CPC ....................................................... G06F 30/12
(Continued)

(56) References Cited

U.S. PATENT DOCUMENTS

| 2005/0080502 | A1* | 4/2005 | Chernyak | G06F 30/00 700/97 |
| 2008/0294396 | A1* | 11/2008 | Hsu | G06F 30/00 703/2 |
| 2008/0294587 | A1* | 11/2008 | Qu | G06F 30/00 706/47 |

FOREIGN PATENT DOCUMENTS

| CN | 102254076 A | 11/2011 |
| CN | 105718669 A | 6/2016 |

(Continued)

OTHER PUBLICATIONS

International Search Report and Written Opinion for International Appl. No. PCT/CN2019/070649, dated Mar. 29, 2019.

*Primary Examiner* — Eric D Lee
(74) *Attorney, Agent, or Firm* — The Webb Law Firm

(57) ABSTRACT

The present disclosure relates to a data processing method for blueprint design, a product lifecycle management (PLM) widget and a computation device. The method comprises: receiving by a PLM widget a first acquisition request from a blueprint design program; in response to the first acquisition request, acquiring by the PLM widget a design check file corresponding to blueprint information of a current blueprint in the blueprint design program from a PLM program, the design check file being used to prompt a user to check design compliance of the current blueprint; and transmitting by the PLM widget the design check file to the blueprint design program.

19 Claims, 5 Drawing Sheets

(58) Field of Classification Search
USPC .......................................................... 716/111
See application file for complete search history.

(56) References Cited

FOREIGN PATENT DOCUMENTS

| | | |
|---|---|---|
| CN | 107145622 A | 9/2017 |
| CN | 109086476 A | 12/2018 |

* cited by examiner

DATA PROCESSING METHOD FOR BLUEPRINT DESIGN, PLM WIDGET AND COMPUTATION DEVICE

CROSS-REFERENCE TO RELATED APPLICATIONS

This application is a U.S. National Stage under 35 U.S.C. § 371 of International Application No. PCT/CN2019/070649, as filed on Jan. 7, 2019, which claims priority to Chinese Patent Application No. 201810628272.4, filed on Jun. 19, 2018, and entitled "DATA PROCESSING METHOD FOR BLUEPRINT DESIGN, PLM WIDGET AND COMPUTATION DEVICE". The disclosure of ach of these applications is incorporated by reference herein in its entirety.

TECHNICAL FIELD

The present disclosure relates to a data processing method for blueprint design, a PLM (Product Lifecycle Management) widget and a computation device.

BACKGROUND

With development of science and technology, in order to enhance a core competitive power of an enterprise, i.e. a product research and development ability, more and more enterprises rely on a PLM program to construct a cooperative design, build a cooperative platform of a research and development design program and a PLM program, cause respective research and development design programs to work cooperatively, achieve in-time information transfer and share between research and development and manufacture, provide accurate and complete product information for production and management, improve a cooperative research and development efficiency and a product innovation ability of an enterprise, shorten a research and development cycle, reduce a product cost.

SUMMARY

Some embodiments of the present disclosure provide a data processing method for blueprint design comprising: receiving by the PLM widget a first acquisition request from a blueprint design program; in response to the first acquisition request, acquiring by the PLM widget a design check file corresponding to blueprint information of a current blueprint in the blueprint design program from a PLM program, the design check file being used to prompt a user to check design compliance of the current blueprint; transmitting by the PLM widget the design check file to the blueprint design program.

In some embodiments, the design check file is a design check instance file or a design check template file, the design check instance file is generated according to the design check template file.

In some embodiments, in response to the first acquisition request, the PLM widget acquiring the design check file corresponding to blueprint information of the current blueprint in the blueprint design program from the PLM program, comprises: in response to the first acquisition request, the PLM widget searching a design check instance file corresponding to the blueprint information in the PLM program; and if it fails to find the design check instance file, the PLM widget acquiring a corresponding design check template file according to the blueprint information to transmit the design check template file to the blueprint design program.

In some embodiments, after the PLM widget transmits the design check template file to the blueprint design program, the method further comprises: the PLM widget receiving the design check instance file from the blueprint design program, the design check instance file being obtained by modifying the design check template file according to product specification requirements corresponding to the current blueprint; the PLM widget transmitting the design check instance file to the PLM program for verification.

In some embodiments, after the PLM widget acquiring the design check file corresponding to the blueprint information from the PLM program, the method further comprises: the PLM widget extracting at least one blueprint attribute of the design check file; according to attribute rights preset in the PLM program, the PLM widget setting a right control flag for each blueprint attribute, and associating it with the design check file, the right control flag being used to denote an operation right of each blueprint attribute in the design check file; the PLM widget transmitting the design check file after the association to the blueprint design program.

In some embodiments, after transmitting the design check file to the blueprint design program, the method further comprises: the PLM widget receiving a storage request from the blueprint design program, the storage request being used to request the current blueprint of the blueprint design program to be saved in the PLM program; in response to the storage request, the PLM widget saving the current blueprint in the PLM program.

In some embodiments, the PLM widget saving the current blueprint in the PLM program comprises: the PLM widget acquiring blueprint design information carried in the storage request; the PLM widget associating the blueprint design information with the current blueprint, and saving it in the PLM program.

In some embodiments, the method further comprises: the PLM widget receiving a part invocation request from the blueprint design program, the part invocation request being used to request invoking a standardized part library of the PLM program; in response to the part invocation request, the PLM widget invoking the standardized part library; the PLM widget generating a part selection interface according to the standardized part library, the part selection interface being used to prompt the user to select target parts from the standardized part library; the PLM widget loading the part selection interface into the blueprint design program for display.

In some embodiments, after the PLM widget loading the part selection interface into the blueprint design program for display, the method further comprises: the PLM widget receiving a selection operation performed by the user in the part selection interface, the selection operation carrying a part flag of a first part; the PLM widget executing the selection operation, and according to the part flag, searching whether there is the first part in the standardized part library; if there is the first part, the PLM widget acquiring blueprint standardization parameters of the first part from the standardized part library; according to the blueprint standardization parameters of the first part, the PLM widget adjusting the first part of the current blueprint.

In some embodiments, after the PLM widget searching whether there is the first part in the standardized part library, the method further comprises: if there is not the first part, the PLM widget generating a part parameter setting interface, the part parameter setting interface being used to prompt the user to set blueprint standardization parameters for the first part; the PLM widget loading the part parameter setting interface into the blueprint design program for display; the PLM widget acquiring the blueprint standardization parameters of the first part set by the user in the part parameter setting interface; the PLM widget saving the blueprint standardization parameters of the first part in the PLM program.

In some embodiments, the PLM widget saving the blueprint standardization parameters of the first part in the PLM program comprises: the PLM widget saving the blueprint standard parameters of the first part in the PLM program in association with the first part in the standardized part library.

Some embodiments of the present disclosure provide a product lifecycle management PLM widget comprising: a first reception unit configured to receive a first acquisition request from a blueprint design program; a first acquisition unit configured to, in response to the first acquisition request, acquire a design check file corresponding to blueprint information of a current blueprint in the blueprint design program from a PLM program, the design check file being used to prompt a user to check design compliance of the current blueprint; a first transmission unit configured to transmit the design check file to the blueprint design program.

In some embodiments, the design check file is a design check instance file or a design check template file, the design check instance file is generated according to the design check template file. The first acquisition unit is further configured to: in response to the first acquisition request, search a design check instance file corresponding to the blueprint information in the PLM program; if it fails to find the design check instance file, acquire a corresponding design check template file according to the blueprint information. The first transmission unit is further configured to transmit the design check template file to the blueprint design program.

In some embodiments, the PLM widget further includes a second transmission unit. The first reception unit is further configured to, after the first transmission unit transmits the design check template file to the blueprint design program, receive the design check instance file from the blueprint design program, the design check instance file is generated by modifying the design check template file according to product specification requirements corresponding to the current blueprint. The second transmission unit is configured to transmit the design check instance file to the PLM program for verification.

In some embodiments, the PLM widget further includes a right setting unit. A right setting unit is configured to, after the first acquisition unit obtains the design check file, extract at least one blueprint attribute of the design check file; according to attribute rights preset in the PLM program, set a right control flag for each blueprint attribute, and associate it with the design check file, the right control flag is used to denote an operation right of each blueprint attribute in the design check file. The first transmission unit is further configured to transmit the design check file after the association to the blueprint design program.

In some embodiments, the PLM widget further includes a first storage unit. The first reception unit is further configured to, after the first transmission unit transmits the design check file to the blueprint design program, receive a storage request from the blueprint design program, the storage request is used to request the current blueprint of the blueprint design program to be saved in the PLM program.

The first storage unit is configured to, in response to the storage request, save the current blueprint in the PLM program.

In some embodiments, the PLM widget further includes an invocation unit, a generation unit and a loading unit. The first reception unit is further configured to receive a part invocation request from the blueprint design program, the part invocation request is used to request invoking a standardized part library of the PLM program. The invocation unit is configured to, in response to the part invocation request, invoke the standardized part library. The generation unit is configured to generate a part selection interface according to the standardized part library, the part selection interface is used to prompt the user to select target parts from the standardized part library. The loading unit is configured to load the part selection interface into the blueprint design program for display.

In some embodiments, the PLM widget further includes: a second reception unit, a search unit, a second acquisition unit and an adjustment unit. The second reception unit is configured to, after the loading unit loads the part selection interface into the blueprint design program for display, receive a selection operation performed by the user in the part selection interface, the selection operation carries a part flag of a first part. The search unit is configured to execute the selection operation, and according to the part flag, searches whether there is the first part in the standardized part library. The second acquisition unit is configured to, if there is the first part, acquire blueprint standardization parameters of the first part from the standardized part library. The adjustment unit is configured to, according to the blueprint standardization parameters of the first part, adjust the first part of the current blueprint.

The PLM widget further includes a third acquisition unit and a second storage unit. The generation unit is configured to, if there is not the first part, generate a part parameter setting interface, the part parameter setting interface is configured to prompt the user to set blueprint standardization parameters for the first part. The loading unit is further configured to load the part parameter setting interface into the blueprint design program for display. The third acquisition unit is configured to receive the blueprint standardization parameters of the first part set by the user in the part parameter setting interface. The second storage unit is configured to save the blueprint standardization parameters of the first part in the PLM program.

Some other embodiments of the present disclosure provide a computation device comprising: at least one processor; and at least one memory coupled to the processor; the processor being configured to invoke program instructions in the memory, to execute steps of the data processing method as described above.

Some other embodiments of the present disclosure provide a storage medium, wherein the storage medium comprises a program stored thereon, wherein the program, when it is run, causes at least one processor execute steps of the data processing method as described above.

BRIEF DESCRIPTION OF THE DRAWINGS

In order to explain some embodiments of the present disclosure or technical solutions in the prior art more clearly, drawings which are needed to be used in the embodiments or the description of the prior art will be introduced briefly below. Obviously, the drawings in the following description are some embodiments of the present disclosure. Those ordinary skilled in the art may further obtain other drawings according to these drawings, without creative labor.

DETAILED DESCRIPTION

Hereinafter, in conjunction with the drawings, technical solutions according to some embodiments of the present disclosure are described clearly and completely. Obviously, described embodiments are a part of embodiments of the present disclosure, but not all of them. Those ordinary skilled in the art may further obtain other embodiments according to these embodiments, without creative labor.

At present, taking a blueprint design program as an example, after a design engineer uses the blueprint design program to accomplish a blueprint design, it is necessary to check the designed blueprint according to a design check file, check whether it complies with a design specification. However, the design check file is usually managed offline through a table or is only recorded in a file management module of a PLM program in the form of an attachment, and when the design engineer needs to use the design check file, he searches a corresponding design check file from many tables or design check files manually again, and since the search is manual, omissions or mistakes are possible, so that accuracy of the blueprint design is affected, efficiency of research and development design is reduced.

Figure 1:
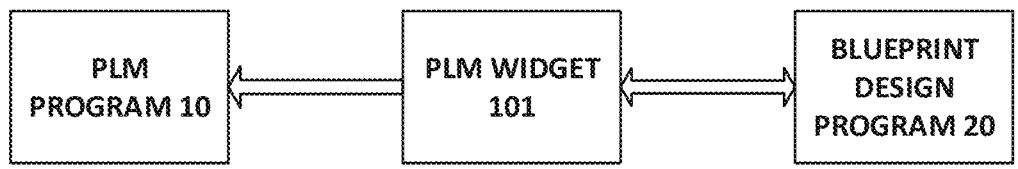
FIG. 1 is a schematic view of a relation of a PLM widget and a PLM program and a blueprint design program according to some embodiments of the present disclosure.

Some embodiments of the present disclosure provide a data processing method for blueprint design which is applied to a PLM widget. FIG. 1 is a schematic view of a relation of a PLM widget and a PLM program and a blueprint design program according to some embodiments of the present disclosure. As shown in FIG. 1, a PLM widget 101 is a widget of a PLM program 10, is loaded in a blueprint design program 20, thereby to achieve integration of the PLM program and the blueprint design program.

In a practical application, the above mentioned PLM program may be Teamcenter, Windchill, ENOVIA, etc, the blueprint design program may be Auto CAD, Mentor, Altium Designer, etc. Of course, other PLM programs and blueprint design programs are also possible, which is not limited specifically in the present disclosure.

Figure 2:
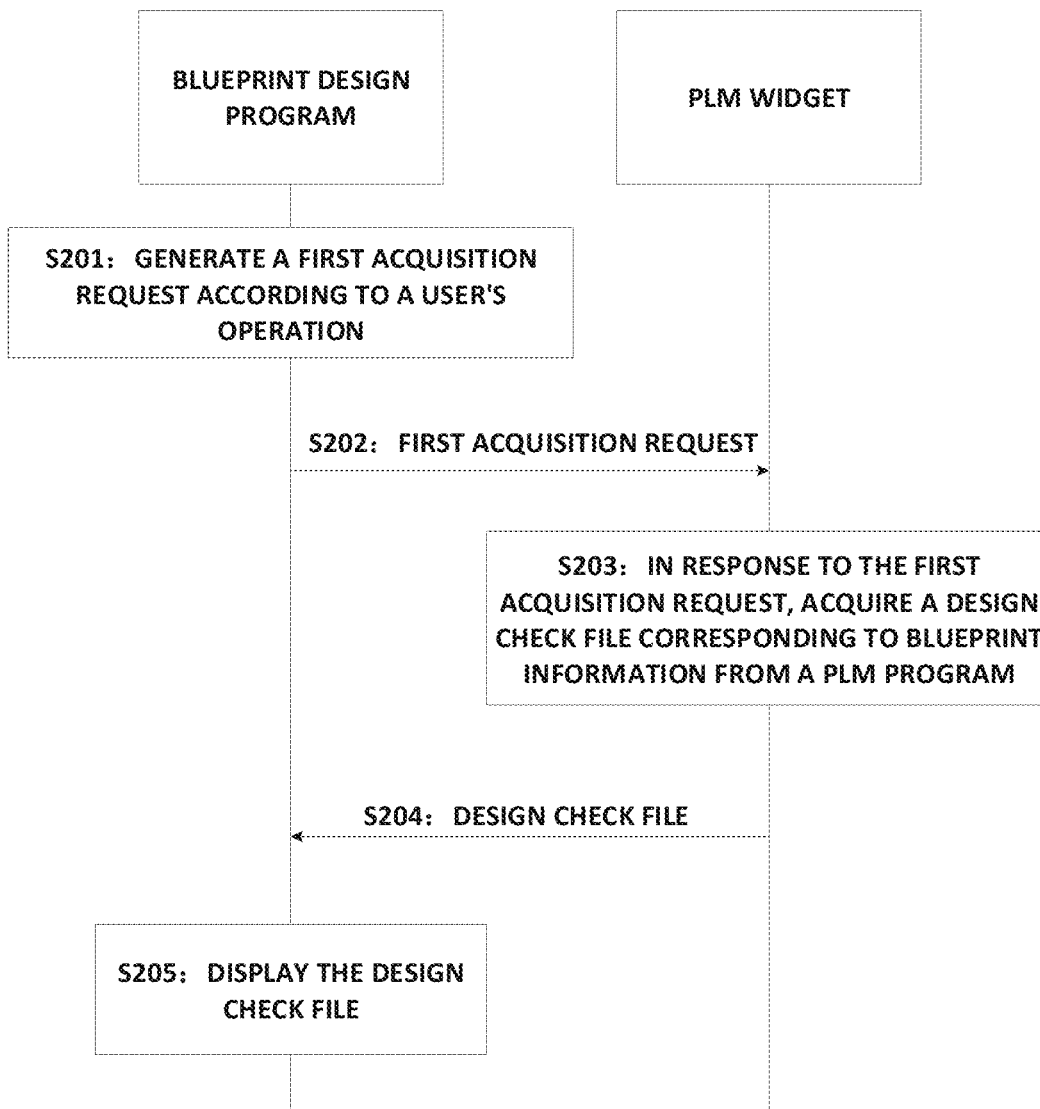
FIG. 2 is a flow diagram of an implementation of a data processing method for blueprint design according to some embodiments of the present disclosure.

FIG. 2 is a flow diagram of an implementation of a data processing method for blueprint design according to some embodiments of the present disclosure, as shown in FIG. 2, the data processing method may include:

S201: a blueprint design program generating a first acquisition request according to a user's operation;

Here, the first acquisition request may carry blueprint information of a current blueprint in the blueprint design program.

Specifically, in course of a blueprint designer using the blueprint design program, if the design of the current blueprint is done, a corresponding design check file is acquired to check the current blueprint, to check whether the blueprint complies with a corresponding design specification. At this time, by operations such as clicking "save current blueprint" or clicking "import design check file", etc, the blueprint designer may trigger the blueprint design program to generate the first acquisition request, and at this time, the blueprint design program generates the first acquisition request according to blueprint information of the current blueprint, the first acquisition request may carry blueprint information such as a factory name, a product category, a process category or a design, etc, of course, the blueprint information may also be an independent file, it is only packaged together with the first acquisition request and transmitted when it is transmitted, which is not limited specifically in the present disclosure.

Figure 3:
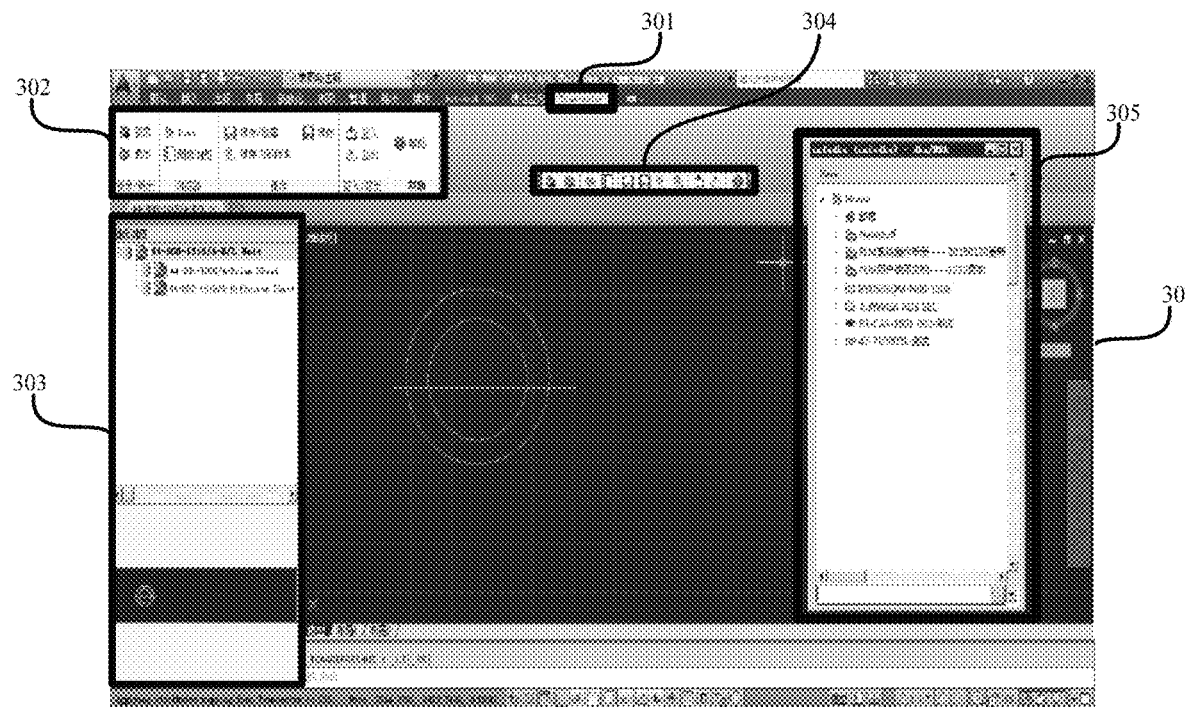
FIG. 3 is a schematic view of a window interface of a blueprint design program according to some embodiments of the present disclosure.

For instance file, after the blueprint designer accomplishes the blueprint design, he may, through a "save" button, etc, in the blueprint design program, trigger the blueprint design program to invoke a PLM widget, to generate the first acquisition request. Or, FIG. 3 is a schematic view of a window interface of a blueprint design program according to some embodiments of the present disclosure, as shown in FIG. 3, after the blueprint designer accomplishes the blueprint design, he may select a PLM widget option card 301 in a window interface 30 of the blueprint design program, the PLM widget option card 301 may include multiple options, e.g. Teamcenter, Windchill, ENOVIA, etc. For instance file, in FIG. 3, a "Teamcenter" option is selected. At this time, the blueprint design program invokes a corresponding PLM widget, e.g. a Teamcenter widget, displays an interface of the PLM widget in the window interface 30 of the blueprint design program, and on the PLM widget interface, the blueprint designer clicks a "save" button in a menu bar 302, and at this time, the blueprint design program generates the first acquisition request.

In some embodiments of the present disclosure, as shown in FIG. 3, the PLM widget interface may also include: a blueprint browse bar 303, a quick access bar 304, a Home interface 305. Of course, the PLM widget interface may also include other toolbars, which is not limited specifically in the present disclosure.

S202: the blueprint design program transmitting the first acquisition request to a PLM widget;

S203: in response to the first acquisition request, the PLM widget acquiring a design check file corresponding to blueprint information from a PLM program;

S204: the PLM widget transmitting the design check file to the blueprint design program;

Here, the above mentioned design check file is used to indicate to check design compliance of the current blueprint, i.e. prompt the user to check the design of the current blueprint according to respective design specifications in the design check file.

In a practical application, the design check file acquired by the above mentioned PLM widget may be a Design check instance file, may also be a Design check template file, here, the design check instance file is generated according to the design check template file.

Specifically, a system administrator may in advance define at least one blueprint attribute corresponding to different product categories or process categories or designs of each factory, and save them in the form of a table (e.g. Excel), and then, the PLM program defines the blueprint attributes in the table as corresponding fields to import them, generates corresponding design check template files, as such, achieves standardized sorting of the design check template files, reduces repetitive data sorting and recording of the blueprint designer. In this way, the system administrator may login the PLM program, select a corresponding factory name, a corresponding product category, a corresponding process category or a corresponding design, and at this time, the PLM program will automatically match a corresponding design check template file, the system administrator may modify the blueprint attributes in the design check template file according to actual design requirements of a product, generate a corresponding design check instance file, and save it in the PLM program.

In a practical application, the above mentioned blueprint attributes may be Item, Sequence number, Check Item, Check Result Description, Check Result, etc. Of course, other blueprint attributes may also be set, which is not limited specifically in the present disclosure.

Then, in S203, after the PLM widget obtains the first acquisition request, it may acquire blueprint information of the current blueprint, such as a factory name, a product category, a process category or a design corresponding to the current blueprint, then, the PLM widget searches a corresponding design check instance file from the PLM program, and in S204, transmits the design check instance file to the blueprint design program.

In other embodiments of the present disclosure, if the system administrator does not upload design check instance files in time or design check instance files can not be acquired, at this time, S203 may include: in response to the first acquisition request, the PLM widget searching a design check instance file corresponding to blueprint information in a PLM program; if it fails to find the design check instance file, the PLM widget acquiring a corresponding design check template file according to blueprint information. At this time, in S204, the PLM widget transmits the design check template file corresponding to blueprint information to the blueprint design program.

Specifically, if the system administrator does not upload design check instance files in time or design check instance files can not be read, at this time, the PLM widget can not find a corresponding design check instance file in the PLM program, so, the PLM widget may search a corresponding design check template file in the PLM program according to blueprint information of the current blueprint, and since the design check template file may include some general design specifications or design specifications of old versions, the PLM widget may transmit the design check template file to the blueprint design program, so that the blueprint designer checks the current blueprint according to blueprint attributes in the design check template file.

Further, in order to further improve accuracy of the blueprint design and improve efficiency of research and development design, after the PLM widget transmits the design check template file to the blueprint design program, the above mentioned method may also include: the blueprint design program displaying the design check template file, and according to modification of the design check template file by the user, generating a design check instance file; the blueprint design program transmitting the design check instance file to the PLM widget; the PLM widget transmitting the design check instance file to the PLM program for verification.

Specifically, after the blueprint design program displays the above mentioned design check template file in a design check interface, the blueprint designer may set blueprint attributes in the design check template file, thus generate a corresponding design check instance file, and the blueprint design program invokes the PLM widget to upload the design check instance file to the PLM program, so that the system administrator performs verification on the design check instance file, and after the verification is passed, the PLM program saves the design check instance file.

It is to be noted that, when the design check instance file is uploaded for verification, the PLM program may automatically display all design check items in a data check interface in a structurized form, highlight updated check items upon verification for a prompt.

S205: the blueprint design program displaying the design check file.

Figure 4:
FIG. 4 is a schematic view of a design check interface of a blueprint design program according to some embodiments of the present disclosure.

Specifically, if the PLM widget finds a corresponding design check file, it transmits the corresponding design check file to the blueprint design program, and after the blueprint design program receives the design check file, it may create a new design check window to display the design check file, for example, FIG. 4 is a schematic view of a design check interface of a blueprint design program according to some embodiments of the present disclosure, as shown in FIG. 4, the blueprint designer may check the current blueprint with reference to respective blueprint attributes 401 shown in the design check interface, and with respect to blueprint attributes which are found not to comply with the design specification, it is possible to prompt the user to perform modification in the blueprint design program.

By now, when the blueprint designer performs the blueprint design in the blueprint design program, he may obtain the design check instance file of the current blueprint through the PLM widget, so that the blueprint designer can check the blueprint design compliance of the current blueprint according to the design check instance file, improve accuracy of the blueprint design and improve efficiency of research and development design.

Based on the aforementioned embodiments, in other embodiments of the present disclosure, in order to improve operation convenience of the blueprint designer, it is also possible to set different operation rights for different blueprint attributes. So, after the above mentioned S203, the above mentioned the method may also include: the PLM widget extracting at least one blueprint attribute of the design check file; according to attribute rights preset in the PLM program, the PLM widget setting a right control flag for each blueprint attribute, and associating it with the design check file, the right control flag being used to denote an operation right of each blueprint attribute in the design check file; the PLM widget transmitting the design check file after the association to the blueprint design program.

In a specific implementation, the system administrator may, in the PLM program, set an attribute right for at least one blueprint attribute in the design check template file and the design check instance file, respectively, for example, set the blueprint attribute to be "whether required" or "whether editable", etc. It is to be noted that, attribute rights of a same blueprint attribute in the design check template file and the design check instance file may be the same, may also be different, which is not limited specifically in the present disclosure.

For instance file, first, the PLM program obtains one design check file, which may be the design check template file and may also be the design check instance file, and then, with respect to the design check file, defines a set S={attr1, attr2, attr3, ... attri, ... attrN} which contains N attributes, i=1, 2, 3, ... N, N is a positive integer. Here, a blueprint attribute of any one attri may select "whether required" and "whether editable"; so, with respect to attri, a composite right control flag T4_LOV_PackingFlag=(flag1, flag2) is defined, wherein, flag1 being Y means that the attribute is required, flag1 being N means that the attribute is optional; flag2 being Y means that the attribute is editable, flag2 being N means that the attribute is not editable. With respect to any one attribute attri, its attribute setting result (flag1i, flag2i) belongs to a set C, C={(Y,Y), (Y, N), (N, Y), (N, N)}; finally, a set which defines judgement of all the blueprint attributes of the design check file is T, T={(flag11, flag21), (flag12, flag22), (flag13, flag23), ..., (flag1i, flag2i), ... (flag1N, flag2N)}, i=1, 2, 3 N.

So, after the PLM widget obtains the first acquisition request, it may obtain the design check file corresponding to the current blueprint, then extract at least one blueprint attribute of the design check file, such as Item, Sequence number, Check Item, Check Result Description, Check Result, etc, and then, judge each blueprint attribute, obtain the set of the blueprint attribute judgement.

In a practical application, the above mentioned step may be achieved by the following method:

First step, Input: the design check file; the number of the blueprint attributes is N; the set of the blueprint attributes is S; the composite right control flag is T4_LOV_PackingFlag.

Second step, Iteration: the blueprint attributes in the design check file,
for i=1 to N do
(1) judge the attri right control flag T4_LOV_PackingFlagi=(flag1i, flag2i);
(2) update i=i+1;
end for Third step, Output: the set T of the final blueprint attribute judgement.

Here, after the PLM widget sets the right control flag for each blueprint attribute according to the set of the blueprint attribute judgement, it associates the above mentioned right control flag with the design check file, the PLM widget transmits the design check file after the association to the blueprint design program. In this way, the blueprint designer can know attribute rights of respective blueprint attributes in the design check file.

In some embodiments of the present disclosure, in order to reduce complexity of right setting and reduce workload of background maintenance, when it is necessary to modify a certain blueprint attribute attrk, the system administrator may, in the PLM program, modify a right control flag T4_LOV_PackingFlagk=(flag1k, flag2k) of the attrk, k=1, 2, 3, ... N, as such, it is possible to simultaneously modify a design check instance file and a design check template file which have the blueprint attribute attrk.

Based on the aforementioned embodiments, in other embodiments of the present disclosure, after the blueprint designer uses a professional blueprint design program to accomplish the blueprint design, he may directly access the PLM program through the PLM widget loaded in the blueprint design program, upload the designed blueprint into the PLM program fast.

Figure 5:
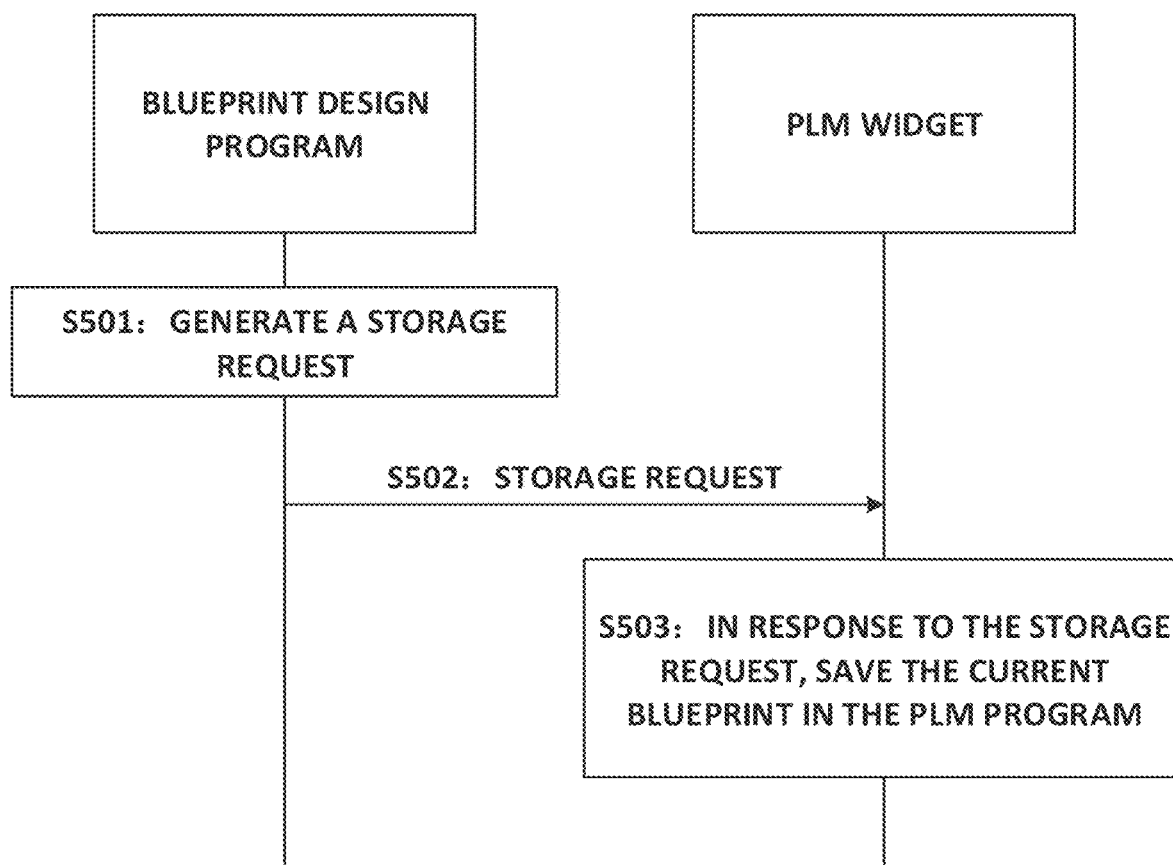
FIG. 5 is a flow diagram of an implementation of a data processing method for blueprint design according to some embodiments of the present disclosure.

FIG. 5 is a flow diagram of an implementation of a data processing method for blueprint design according to some embodiments of the present disclosure, as shown in FIG. 5, after S205, the above mentioned method may also include:

S501: the blueprint design program generating a storage request;

wherein, the storage request is used to request the current blueprint of the blueprint design program to be saved in the PLM program;

specifically, after the blueprint designer accomplishes the blueprint design in the blueprint design program, he triggers the blueprint design program to generate the storage request, for example, clicks a "save" button in a window interface as shown in FIG. 3 to trigger the blueprint design program to generate the storage request, or, after the blueprint designer finishes checking the design compliance of the current blueprint according to the above mentioned design check file, he may also trigger the blueprint design program to generate the storage request, and of course, it is also possible to trigger the blueprint design program to generate the storage request in other methods, which is not limited specifically in the present disclosure.

S502: the blueprint design program transmitting the storage request to the PLM widget;

S503: in response to the storage request, the PLM widget saving the current blueprint in the PLM program.

Specifically, after the PLM widget receives the storage request, in response to the storage request, the PLM widget accesses the PLM program, saves the current blueprint in the PLM program, as such, it is possible to solve a problem in which the blueprint needs to first complete its design in the blueprint design program and is saved locally and then is uploaded to the PLM program, greatly improve uploading efficiency of the blueprint.

Further, after the PLM widget receives the storage request, it may also acquire blueprint design information carried in the storage request, such as a blueprint number, a version or a sequence number of the current blueprint, etc, then, associate the blueprint design information with the current blueprint, and save it in the PLM program.

Optionally, the PLM widget associates the current blueprint with corresponding parts, then uploads the current blueprint to the PLM program to be saved. For example, the PLM widget searches blueprint versions already existing in the PLM program, and when a corresponding blueprint version is found, the PLM widget can obtain parts associated with the blueprint version, and at this time, associate the part items with the current blueprint, and upload them to the PLM program to be saved; if the above mentioned parts do not exist, the PLM widget may indicate the blueprint software program to directly create new parts, and associate them with the current blueprint, and upload them into the PLM program to be saved.

Or, if the current blueprint is a newly created blueprint, before saving the current blueprint, it is necessary for the blueprint designer to set all attributes of the current blueprint, then, upload the current blueprint to the PLM program to be saved. At this time, a blueprint name of the current blueprint will be changed to "blueprint number-version-sequence number", the PLM widget will also save the current blueprint and "blueprint number-version-sequence number" in the PLM program in association with each other.

After this, the PLM widget may also, in the PLM program, initiate verification of the current blueprint, which is not limited specifically in the present disclosure.

Thus, a process of blueprint fast uploading is done. Since after the blueprint designer uses a professional blueprint design program to accomplish the blueprint design, he may directly access the PLM program through the PLM widget loaded in the blueprint design program, upload the designed blueprint into the PLM program fast, therefore it is not necessary to first save the blueprint locally and then upload it to the PLM program from a local place, thereby fast uploading of the blueprint is achieved.

Based on the aforementioned embodiment, in other embodiments of the present disclosure, in order to facilitate invocation of parts and improve efficiency of the blueprint design, it is also possible to standardize the parts, prestore a standard part library in the PLM program, standardization parameters of respective parts are saved in the standardized part library, such as a frame size of a part, a line margin, etc.

Figure 6:
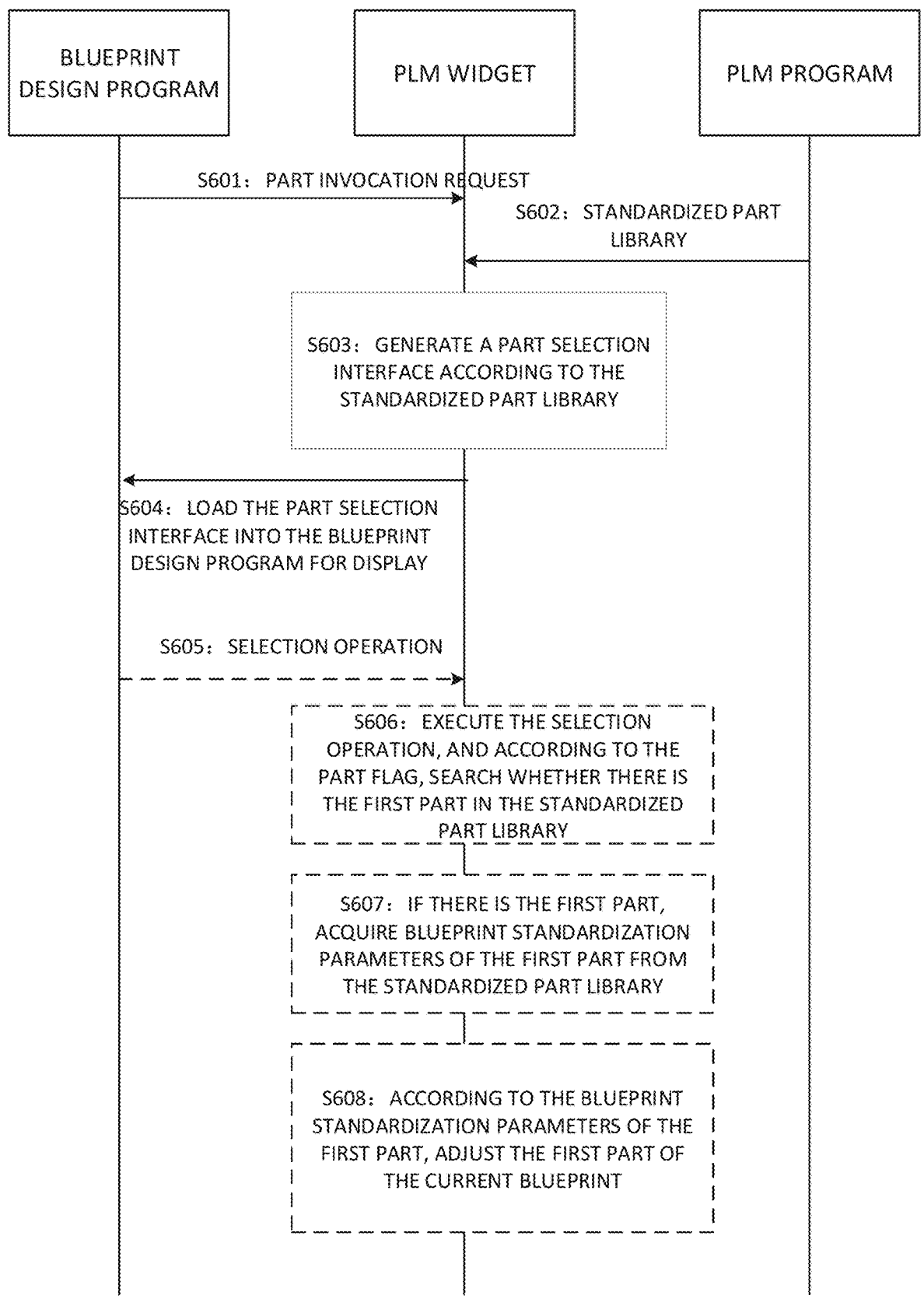
FIG. 6 is a flow diagram of an implementation of a data processing method for blueprint design according to some embodiments of the present disclosure.

FIG. 6 is a flow diagram of an implementation of a data processing method for blueprint design according to some embodiments of the present disclosure, as shown by solid lines in FIG. 6, the method may include:

S601: a blueprint design program generating a part invocation request, and transmitting the part invocation request to a PLM widget, the part invocation request being used to request invoking a standardized part library of a PLM program;

S602: in response to the part invocation request, the PLM widget invoking the standardized part library;

S603: the PLM widget generating a part selection interface according to the standardized part library;

wherein, the part selection interface is used to prompt the user to select target parts from the standardized part library;

S604: the PLM widget loading the part selection interface to the blueprint design program for display.

Specifically, in course of the blueprint design, if the blueprint designer needs to add parts in the current blueprint, he may trigger the blueprint design program to generate the part invocation request, for example, the blueprint designer selects a Home interface 305 in the interface as shown in FIG. 3, and at this time, the blueprint design program generates the part invocation request, to request invoking the standardized part library of the PLM program. In response to the part invocation request, the PLM widget accesses the PLM program, and invokes the standardized part library prestored therein. Then, the PLM widget will invoke the standardized part library, and according to the standardized part library, generate the part selection interface, and in the part selection interface, indexes of respective standardized parts may be displayed, to be selected by the blueprint designer. The PLM widget transmits the part selection interface to the blueprint design program, the blueprint design program may select the Home interface 305 in the interface as shown in FIG. 3 to display the part selection interface, may also generate an independent window, to display the part selection interface, which is not limited specifically in the present disclosure.

In other embodiments of the present disclosure, after the PLM program loads the part selection interface into the blueprint design program for display, as shown by broken lines in FIG. 6, the method may also include:

S605: the PLM widget receiving a selection operation performed by the user in the part selection interface;

wherein, the selection operation carries a part flag of a first part;

specifically, after the part selection interface is displayed in the blueprint design program, the blueprint designer may perform the selection operation on the part selection interface, select the first part, and at this time, the PLM widget receives these selection operations, the selection operations carry the part flag of the first part.

S606: the PLM widget executing the selection operation, and according to the part flag, searching whether there is the first part in the standardized part library;

Specifically, the PLM widget executes the above mentioned selection operation, and according to the part flag of the first part, such as a part number, a model, etc, searches whether there is the corresponding first part in the standardized part library acquired from the PLM program;

S607: if there is the first part, the PLM widget acquiring blueprint standardization parameters of the first part from the standardized part library;

S608: according to the blueprint standardization parameters of the first part, the PLM widget adjusting the first part of the current blueprint.

Specifically, after the PLM widget finds the first part in the standardized part library, this indicates that there is the first part in the standardized part library, and at this time, the PLM widget adjusts the first part in the current blueprint according to the blueprint standardization parameters of the first part, to satisfy requirements of the blueprint design.

Further, after S606, the method may also include: if there is not the first part, generating a part parameter setting interface, the part parameter setting interface being used to prompt the user to set blueprint standardization parameters for the first part; loading the part parameter setting interface into the blueprint design program for display; acquiring the blueprint standardization parameters of the first part set by the user in the part parameter setting interface; saving the blueprint standardization parameters of the first part in the PLM program.

Specifically, when the PLM widget finds that there is not the first part in the part standard library, it may generate the part parameter setting interface, and display the interface in the window of the blueprint design program, and at this time, the blueprint designer may perform standardization parameter setting on the first part in the interface, and after the PLM widget obtains the blueprint standardization parameters of the first part set by the blueprint designer, the PLM widget saves them in the PLM program.

Further, the PLM program may save the blueprint standard parameters of the first part in the PLM program in association with the first part in the standardized part library, as such, achieve update of the standardized part library, facilitate invocation of parts later.

Thus, a fast invocation process of the blueprint part is done. Since, in course of designing the blueprint, the blueprint design software may directly invoke the part standard library of the PLM program and parts therein through the PLM widget, this greatly saves the blueprint designer's time for drawing, simultaneously also ensures synchronization of information transmission.

From the above, it may be known that, in the data processing method for blueprint design provided by some embodiments of the present disclosure, first, the PLM widget of the PLM program is loaded in the blueprint design program, so, after the blueprint design program accomplishes the blueprint design, the PLM widget receives the first acquisition request from the blueprint design program, then, in response to the first acquisition request, the PLM widget acquires the design check file corresponding to blueprint information of the current blueprint in the blueprint design program carried in the first acquisition request from the PLM program, and then transmits the design check file to the blueprint design program. As may be seen that, in some embodiments of the present disclosure, the blueprint design program and the PLM program achieve integration through the PLM widget, and in this way, the blueprint design program may directly obtain the design check file corresponding to the current blueprint through the PLM widget, avoid searching the design check file manually, thereby improve accuracy of the blueprint design and improve efficiency of research and development design.

Based on the same inventive concept, some embodiments of the present disclosure also provide a PLM widget which is consistent with the PLM widgets in the above mentioned one or more embodiments. The PLM widget is a widget of the PLM program, the PLM widget is loaded to the blueprint design program.

Figure 7:
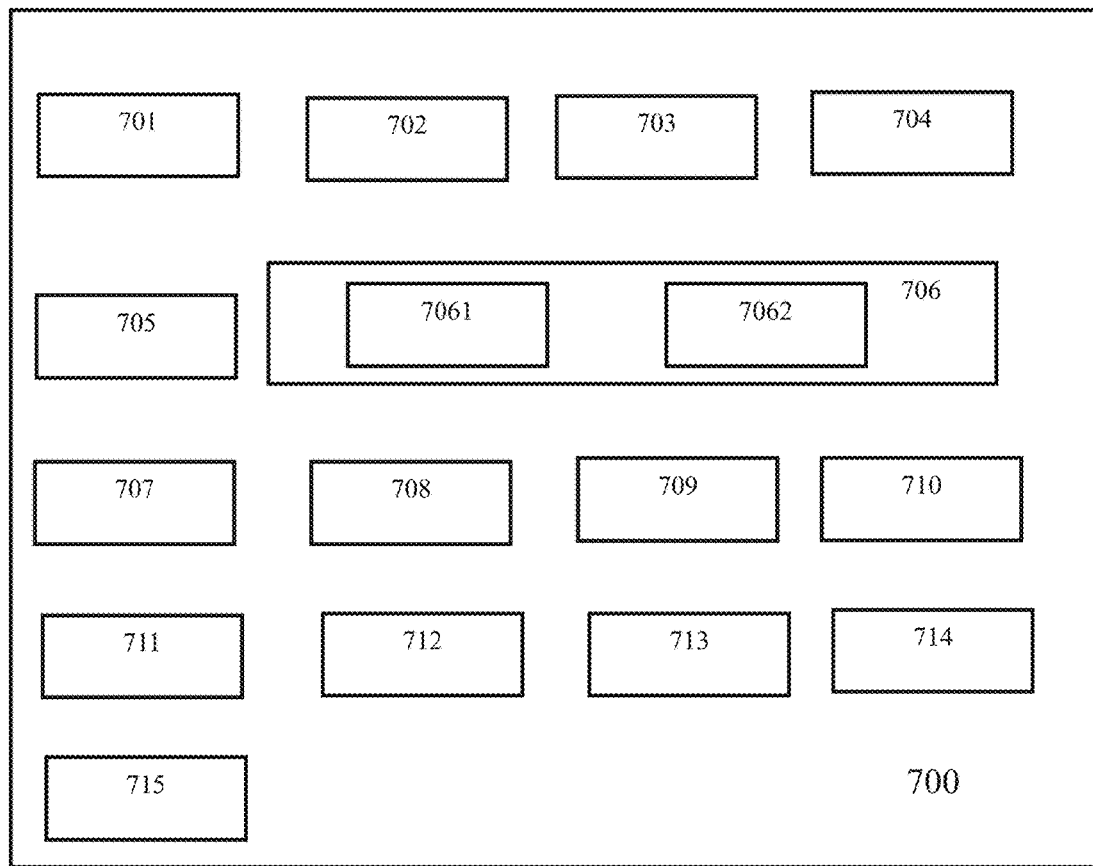
FIG. 7 is a structural diagram of a PLM widget according to some embodiments of the present disclosure.

FIG. 7 is a structural diagram of a PLM widget according to some embodiments of the present disclosure, as shown in FIG. 7, the PLM widget 700 may include: a first reception unit 701 configured to receive a first acquisition request from a blueprint design program; a first acquisition unit 702 configured to acquire a design check file corresponding to blueprint information of a current blueprint in the blueprint design program from a PLM program, the design check file being used to prompt the user to check design compliance of the current blueprint; a first transmission unit 703 configured to transmit the design check file to the blueprint design program.

In some embodiments of the present disclosure, the above mentioned design check file is a design check instance file or a design check template file, the design check instance file is generated according to the design check template file.

In some embodiments of the present disclosure, the first acquisition unit 702 is configured to, in response to the first acquisition request, search a design check instance file corresponding to blueprint information in the PLM program; if it fails to find the design check instance file, acquire a corresponding design check template file according to blueprint information; the first transmission unit 703 is configured to transmit the design check template file to the blueprint design program.

In some embodiments of the present disclosure, the above mentioned PLM widget further includes a second transmission unit 704; so, the first reception unit 701 is further configured to, after the first transmission unit transmits the design check template file to the blueprint design program, receive the design check instance file from the blueprint design program, the design check instance file is obtained by modifying the design check template file according to product specification requirements corresponding to the current blueprint; the second transmission unit 704 is configured to transmit the design check instance file to the PLM program for verification.

In some embodiments of the present disclosure, the above mentioned PLM widget further includes: a right setting unit 705 configured to, after the first acquisition unit obtains the design check file, extract at least one blueprint attribute of the design check file; according to attribute rights preset in the PLM program, set a right control flag for each blueprint attribute, and associate it with the design check file, the right control flag being configured to denote an operation right of each blueprint attribute in the design check file; the first transmission unit 703 further configured to transmit the design check file after the association to the blueprint design program.

In some embodiments of the present disclosure, the above mentioned PLM widget may further include: a first storage unit 706; wherein, the first reception unit 701 is further configured to, after the first transmission unit transmits the design check file to the blueprint design program, receive a storage request from the blueprint design program, the storage request is used to request the current blueprint of the blueprint design program to be saved in the PLM program; the first storage unit 706 is configured to, in response to the storage request, save the current blueprint in the PLM program.

In some embodiments of the present disclosure, the above mentioned first storage unit 706 includes: an acquisition subunit 7061 and a storage subunit 7062; wherein, the acquisition subunit 7061 is configured to acquire blueprint design information carried in the storage request; the storage subunit 7062 is configured to associate the blueprint design information with the current blueprint, and save it in the PLM program.

In some embodiments of the present disclosure, the above mentioned PLM widget further includes: an invocation unit 707, a generation unit 708 and a loading unit 709; wherein, the first reception unit 701 is further configured to receive a part invocation request from the blueprint design program, the part invocation request is used to request invoking a standardized part library of the PLM program; the invocation unit 707 is configured to, in response to the part invocation request, invoke the standardized part library; the generation unit 708 is configured to generate a part selection interface according to the standardized part library, the part selection interface is used to prompt the user to select target parts from the standardized part library; the loading unit 709 is configured to load the part selection interface to the blueprint design program for display.

In some embodiments of the present disclosure, the above mentioned PLM widget further includes: a second reception unit 710, a search unit 711, a second acquisition unit 712 and an adjustment unit 713; wherein, the second reception unit 710 is configured to, after the loading unit 709 loads the part selection interface into the blueprint design program for display, receive a selection operation performed by the user in the part selection interface, the selection operation carries a part flag of a first part; the search unit 711 is configured to execute the selection operation, and according to the part flag, searches whether there is the first part in the standardized part library; the second acquisition unit 712 is configured to, if there is the first part, acquire blueprint standardization parameters of the first part from the standardized part library; the adjustment unit 713 is configured to, according to the blueprint standardization parameters of the first part, adjust the first part of the current blueprint.

In some embodiments of the present disclosure, the above mentioned PLM widget further includes: a third acquisition unit 714 and a second storage unit 715; wherein, the generation unit 708 is configured to, if there is not the first part, generate a part parameter setting interface, the part parameter setting interface is used to prompt the user to set blueprint standardization parameters for the first part; the loading unit 709 is further configured to load the part parameter setting interface into the blueprint design program for display; the third acquisition unit 714 is configured to receive the blueprint standardization parameters of the first part set by the user in the part parameter setting interface; the second storage unit 715 is configured to save the blueprint standardization parameters of the first part in the PLM program.

In some embodiments of the present disclosure, the second storage unit 715 is configured to save the blueprint standard parameters of the first part in the PLM program in association with the first part in the standardized part library.

Those skilled in the art may understood that, one or more of respective units exemplified in FIG. 7 may be implemented separately or integrally. Those skilled in the art may understood that, in some embodiments, one or more of respective units exemplified in FIG. 7 may be omitted. In some embodiments, the PLM widget may include more or less assemblies than those exemplified in FIG. 7.

Here, it is to be pointed out that: the description of the above embodiments of the PLM widget is similar to the description of the above mentioned method embodiments, has advantageous effects similar to the method embodiments. Technical details which are not disclosed in the PLM widget embodiments of the present disclosure are understood with reference to the description of the method embodiments of the present disclosure.

Figure 8:
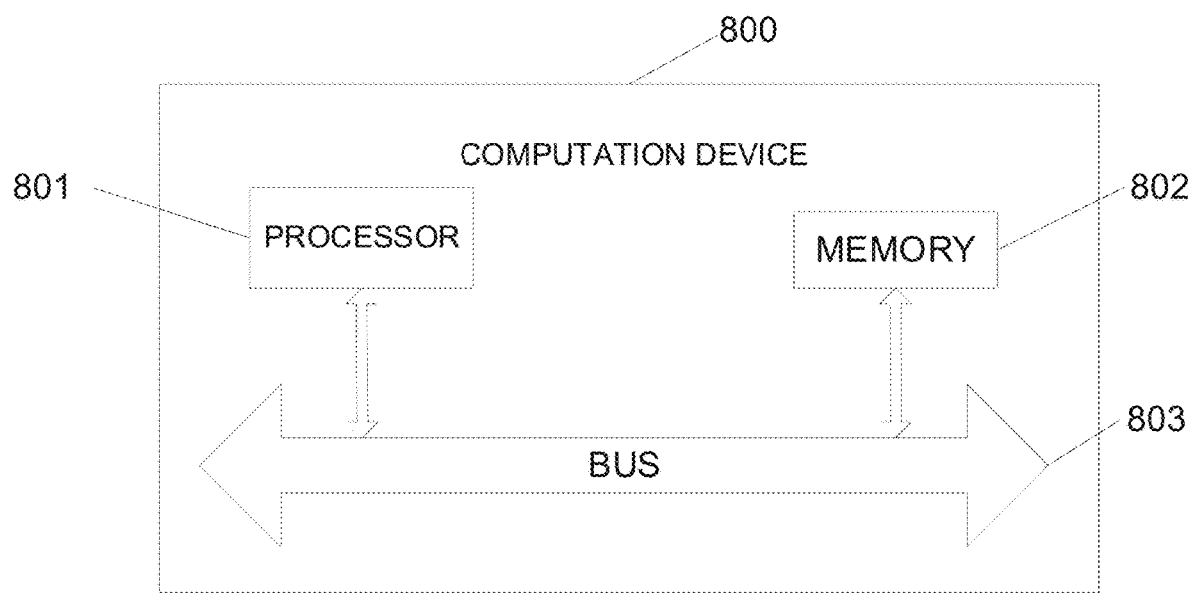
FIG. 8 is a structural diagram of a computation device according to some embodiments of the present disclosure.

Based on the same inventive concept, some embodiments of the present disclosure also provide a computation device, FIG. 8 is a structural diagram of a computation device according to some embodiments of the present disclosure, as shown in FIG. 8, the computation device 800 includes: at least one processor 801; and at least one memory 802, a bus 803, connected with the processor 801; wherein, the processor 801, the memory 802 accomplish mutual communication therebetween through the bus 803; the processor 801 is configured to invoke program instructions in the memory 802, to execute steps of the data processing method for blueprint design as described in the above mentioned one or more embodiments.

Those skilled in the art may understand that, the computation device as shown in FIG. 8 may be used to achieve one or more of the above mentioned PLM widget, PLM program and graph design program, may achieve a part or all of them, respectively.

Here, the above mentioned processor may include a CPU (Central Processing Unit), a GPU (Graphics Processing Unit), an Embedded MCU (Microcontroller Unit), a EMPU (Embedded Microprocessor Unit), an Embedded DSP (Digital Signal Processor) or a SoC (System on a Chip), etc. Some embodiments of the present disclosure do not impose specific limitations.

Based on the same inventive concept, some embodiments of the present disclosure also provide a storage medium, the storage medium includes a program stored thereon, wherein, when the program is run, the program controls an apparatus where the storage medium is located to execute steps of the data processing method for blueprint design as described in the above mentioned one or more embodiments.

In the data processing method for blueprint design, the PLM widget and the computation device, provided by some embodiments of the present disclosure, first, the PLM widget of the PLM program is loaded in the blueprint design program, so, after the blueprint design program accomplishes the blueprint design, the PLM widget receives the first acquisition request from the blueprint design program, then, in response to the first acquisition request, the PLM widget acquires the design check file corresponding to blueprint information of the current blueprint in the blueprint design program carried in the first acquisition request from the PLM program, and then transmits the design check file to the blueprint design program. As may be seen that, in some embodiments of the present disclosure, the blueprint design program and the PLM program achieve integration through the PLM widget, and in this way, the blueprint design program may directly obtain the design check file corresponding to the current blueprint through the PLM widget, avoid searching the design check file manually, thereby improve accuracy of the blueprint design and improve efficiency of research and development design.

Those skilled in the art should understand that, an embodiment of the present disclosure may be provided as a method, a system, or a computer program product. Therefore, the present disclosure may take the form of an entirely hardware embodiment, an entirely software embodiment or an embodiment combining software and hardware aspects. Moreover, the present disclosure may take the form of a computer program product embodied in one or more computer usable storage medium(s) having computer useable program code embodied thereon (include, but not limited to, a magnetic disk memory, CD-ROM, an optical memory, etc).

The present disclosure is described with reference to flowchart illustrations and/or block diagrams of methods, apparatus (systems) and computer program products according to some embodiments of the disclosure. It will be understood that each flow and/or block of the flowchart illustrations and/or block diagrams, and combinations of flows and/or blocks in the flowchart illustrations and/or block diagrams, may be implemented by computer program instructions. These computer program instructions may be provided to a processor of a general purpose computer, special purpose computer, embedded processor or other programmable data processing apparatus to produce a machine, such that the instructions, which execute via the processor of the computer or other programmable data processing apparatus, create a PLM widget for implementing the functions specified in one or more flows of the flowchart and/or one or more block of block diagram.

These computer program instructions may also be stored in a computer-readable memory that can direct a computer or other programmable data processing apparatus to function in a particular manner, such that the instructions stored in the computer-readable memory produce an article of manufacture including an instruction PLM widget which implement the functions specified in one or more flows of the flowchart and/or one or more block of block diagram.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in one or more flows of the flowchart and/or one or more block of block diagram.

While preferable embodiments of the present disclosure have been described, once those skilled in the art know basic creative concepts, they may make additional modifications and changes to these embodiments. Therefore, the appended claims are intended to be construed to include preferable embodiments as well as all modifications and changes which fall into the scope of the present disclosure.

Obviously, those skilled in the art may make various changes and modifications to the present disclosure without departing from the spirit and the scope of the present disclosure. Thus, if these changes and modifications to the present disclosure are within the scope of claims of the present disclosure and equivalent technology, the present disclosure is also intended to cover these changes and modifications.

What is claimed is:

1. A data processing method for blueprint design comprising:
   receiving by a product lifecycle management (PLM) widget a first acquisition request from a blueprint design program;
   in response to the first acquisition request, acquiring, by the PLM widget, blueprint information of a current blueprint in the blueprint design program;

acquiring, by the PLM widget, a design check file corresponding to the blueprint information of the current blueprint in the blueprint design program from a PLM program based on the blueprint information of the current blueprint, the design check file being used to prompt a user to check design compliance of the current blueprint; and transmitting by the PLM widget the design check file to the blueprint design program.

2. The data processing method according to claim 1, wherein the design check file is a design check instance file or a design check template file, the design check instance file is generated according to the design check template file.

3. The data processing method according to claim 2, wherein in response to the first acquisition request, acquiring by the PLM widget the design check file corresponding to blueprint information of the current blueprint in the blueprint design program from the PLM program, comprises:

in response to the first acquisition request, searching by the PLM widget a design check instance file corresponding to the blueprint information in the PLM program; and if the design check instance file cannot be found, acquiring by the PLM widget a corresponding design check template file according to the blueprint information to transmit the design check template file to the blueprint design program.

4. The data processing method according to claim 3, wherein after transmitting by the PLM widget the design check file to the blueprint design program, the method further comprises:

receiving by the PLM widget the design check instance file from the blueprint design program, the design check instance file being obtained by modifying the design check template file according to product specification requirements corresponding to the current blueprint;

transmitting by the PLM widget the design check instance file to the PLM program for verification.

5. The data processing method according to claim 1, wherein after acquiring by the PLM widget the design check file corresponding to the blueprint information from the PLM program, the method further comprises:

extracting by the PLM widget at least one blueprint attribute of the design check file;

according to attribute rights preset in the PLM program, setting by the PLM widget a right control flag for each blueprint attribute, and associating it with the design check file, the right control flag being used to denote an operation right of each blueprint attribute in the design check file;

transmitting by the PLM widget the design check file after an association to the blueprint design program.

6. The data processing method according to claim 1, wherein after transmitting the design check file to the blueprint design program, the method further comprises:

receiving by the PLM widget a storage request from the blueprint design program, the storage request being used to request the current blueprint of the blueprint design program to be saved in the PLM program;

in response to the storage request, saving by the PLM widget the current blueprint in the PLM program.

7. The data processing method according to claim 6, wherein the PLM widget saving the current blueprint in the PLM program comprises:

acquiring by the PLM widget blueprint design information carried in the storage request;

associating by the PLM widget the blueprint design information with the current blueprint, and saving it in the PLM program.

8. The data processing method according to claim 1, further comprising:

receiving by the PLM widget a part invocation request from the blueprint design program, the part invocation request being used to request invoking a standardized part library of the PLM program;

in response to the part invocation request, invoking by the PLM widget the standardized part library;

generating by the PLM widget a part selection interface according to the standardized part library, the part selection interface being used to prompt the user to select target parts from the standardized part library;

loading by the PLM widget the part selection interface into the blueprint design program for display.

9. The data processing method according to claim 8, wherein after loading by the PLM widget the part selection interface into the blueprint design program for display, the method further comprises:

receiving by the PLM widget a selection operation performed by the user in the part selection interface, the selection operation carrying a part flag of a first part;

executing by the PLM widget the selection operation, and according to the part flag, searching whether there is the first part in the standardized part library;

acquiring by the PLM widget blueprint standardization parameters of the first part from the standardized part library, if there is the first part;

adjusting by the PLM widget the first part of the current blueprint according to the blueprint standardization parameters of the first part.

10. The data processing method according to claim 9, wherein after searching by the PLM widget whether there is the first part in the standardized part library, the method further comprises:

if there is not the first part, generating by the PLM widget a part parameter setting interface, the part parameter setting interface being used to prompt the user to set blueprint standardization parameters for the first part;

loading by the PLM widget the part parameter setting interface into the blueprint design program for display;

acquiring by the PLM widget the blueprint standardization parameters of the first part set by the user in the part parameter setting interface;

saving by the PLM widget the blueprint standardization parameters of the first part in the PLM program.

11. The data processing method according to claim 10, wherein saving by the PLM widget the blueprint standardization parameters of the first part in the PLM program comprises:

saving by the PLM widget the blueprint standard parameters of the first part in the PLM program in association with the first part in the standardized part library.

12. A computation device comprising:

at least one processor; and at least one memory coupled to the at least one processor;

the at least one processor being configured to invoke program instructions in the at least one memory, to execute steps of a data processing method comprising:

receiving a first acquisition request from a blueprint design program;

in response to the first acquisition request, acquiring, by a product lifecycle management (PLM) widget blueprint information of a current blueprint in the blueprint design program;

acquiring a design check file corresponding to the blueprint information of the current blueprint in the blueprint design program from a PLM program based on the blueprint information of the current blueprint, the design check file being used to prompt a user to check design compliance of the current blueprint; and transmitting the design check file to the blueprint design program.

13. The computation device of claim 12, wherein the design check file is a design check instance file or a design check template file, the design check instance file is generated according to the design check template file;

wherein the at least one processor is configured to invoke the program instructions in the at least one memory, to execute steps of the data processing method further comprising:

in response to the first acquisition request, searching a design check instance file corresponding to the blueprint information in the PLM program, if the design check instance file cannot be found, acquiring a corresponding design check template file according to the blueprint information; and transmitting the design check template file to the blueprint design program.

14. The computation device of claim 12, wherein the at least one processor is configured to invoke the program instructions in the at least one memory, to execute steps of the data processing method further comprising:

after transmitting the design check template file to the blueprint design program, receiving the design check instance file from the blueprint design program, the design check instance file is generated by modifying the design check template file according to product specification requirements corresponding to the current blueprint; and transmitting the design check instance file to the PLM program for verification.

15. The computation device of claim 12, wherein the at least one processor is configured to invoke the program instructions in the at least one memory, to execute steps of the data processing method further comprising:

after obtaining the design check file, extracting at least one blueprint attribute of the design check file;

according to attribute rights preset in the PLM program, setting a right control flag for each blueprint attribute, and associating it with the design check file, the right control flag being used to denote an operation right of each blueprint attribute in the design check file; and transmitting the design check file after an association to the blueprint design program.

16. The computation device of claim 12, wherein the at least one processor is configured to invoke the program instructions in the at least one memory, to execute steps of the data processing method further comprising:

after transmitting the design check file to the blueprint design program, receiving a storage request from the blueprint design program, the storage request is used to request the current blueprint of the blueprint design program to be saved in the PLM program, and in response to the storage request, saving the current blueprint in the PLM program.

17. The computation device of claim 12, wherein the at least one processor is configured to invoke the program instructions in the at least one memory, to execute steps of the data processing method further comprising:

receiving a part invocation request from the blueprint design program, the part invocation request is used to request invoking a standardized part library of the PLM program;

in response to the part invocation request, invoking the standardized part library;

generating a part selection interface according to the standardized part library, the part selection interface is used to prompt the user to select target parts from the standardized part library; and loading the part selection interface into the blueprint design program for display.

18. The computation device of claim 17, wherein the at least one processor is configured to invoke the program instructions in the at least one memory, to execute steps of the data processing method further comprising:

after loading the part selection interface into the blueprint design program for display, receiving a selection operation performed by the user in the part selection interface, the selection operation carries a part flag of a first part;

executing the selection operation, and according to the part flag, searching whether there is the first part in the standardized part library;

if there is the first part, acquiring blueprint standardization parameters of the first part from the standardized part library;

according to the blueprint standardization parameters of the first part, adjusting the first part of the current blueprint;

generating a part parameter setting interface, the part parameter setting interface is used to prompt the user to set blueprint standardization parameters for the first part;

loading the part parameter setting interface into the blueprint design program for display;

receiving the blueprint standardization parameters of the first part set by the user in the part parameter setting interface; and saving the blueprint standardization parameters of the first part in the PLM program.

19. A non-transient storage medium, wherein the storage medium comprises a program stored thereon, wherein the program, when it is run, causes at least one processor to execute steps of a data processing method for blueprint design comprising:

receiving by a product lifecycle management (PLM) widget a first acquisition request from a blueprint design program;

in response to the first acquisition request, acquiring, by the PLM widget, blueprint information of a current blueprint in the blueprint design program;

acquiring, by the PLM widget, a design check file corresponding to blueprint information of a current blueprint in the blueprint design program from a PLM program based on the blueprint information of the current blueprint, the design check file being used to prompt a user to check design compliance of the current blueprint;

transmitting by the PLM widget the design check file to the blueprint design program.

* * * * *